United States Patent
Turchetti

[11] Patent Number: 5,868,925
[45] Date of Patent: Feb. 9, 1999

[54] FILTERING ASSEMBLY

[76] Inventor: Attilio Turchetti, Rodovia BR-060, s/no.-Kms. 213/233, Goiania, Brazil, 74431-970

[21] Appl. No.: 816,983

[22] Filed: Mar. 13, 1997

[30] Foreign Application Priority Data

Mar. 15, 1996 [BR] Brazil ..................................... 9600697

[51] Int. Cl.$^6$ .................................................. B01D 33/50
[52] U.S. Cl. .......................... 210/86; 162/258; 210/108; 210/143; 210/249; 210/388; 210/393; 210/411
[58] Field of Search ................. 210/85, 86, 104, 210/96.1, 106–108, 143, 232, 241, 249, 388, 389, 393, 398, 399, 411, 413–415, 425; 162/258

[56] References Cited

U.S. PATENT DOCUMENTS

| | | | |
|---|---|---|---|
| Re. 34,218 | 4/1993 | Drori | 210/108 |
| 4,043,918 | 8/1977 | Orona | 210/356 |
| 4,830,122 | 5/1989 | Walter | 175/106 |
| 5,736,039 | 4/1998 | Turchetti | 210/249 |

Primary Examiner—Peter A. Hruskoci
Attorney, Agent, or Firm—Herbert Dubno

[57] ABSTRACT

A filtering assembly for separating solids suspended in a solution includes a control device closing a plurality of supply devices for the solution to be filtered and for washing liquid and opening a drain valve of an outlet of the assembly in response to a critical level of accumulation of solids on a pulp detector.

3 Claims, 2 Drawing Sheets

FILTERING ASSEMBLY

FIELD OF THE INVENTION

The present invention relates to a controllable filter assembly used for separation of solids suspended in a liquid and more particularly to the filtering assembly capable of controllably shutting down a supply of a product to be filtered in response to a defect in the filtering assembly and evacuating an accumulated nonsoluble material from the system.

BACKGROUND OF THE INVENTION

Filtering systems of the type described herebelow are known and, in general, as disclosed in Applicant's copending applications 08/893,698 and 08/272,695 and the U.S. Pat. No. 5,736,039, include a rocking filter body provided with a filtering sleeve which houses a two stage helical turbine generating a filtering effect. Further the filtering system has a counterwashing circuit formed with a plurality of arc shaped piping mounted around the rocking body and connected to a washing liquid supply means which is provided with a plurality of radially extending into the filter body nozzles or nipples and terminating around the filtering sleeve. Finally the filtered exit circuit includes a grid shaped pulp detector housed within a tank receiving the filtered product and formed under the filtered product exit of the rocking filter body.

The described above structure is reliable and well performing unless the filtering sleeve is ruptured. As a result the non-soluble solid material separated from the liquid product by the turbine and intended to be evacuated through a respective exit of the rocking body is accumulated by the grid pulp causing thereby misfunction of a pulp detector which leads, in turn, to an overflow in the tank and eventually to a loss of the processed product.

As a result of the mentioned above drawback the assembly is controlled by a skilled worker who in case of emergency has to disconnect parts of the assembly to clean the tank.

Still another problem stemming from the known structure is reprocessing of an already processed product leading to an inefficient process.

OBJECTS OF THE INVENTION

It is therefore a principal object of the present invention to overcome the drawbacks of the prior art.

Still another object of the present invention is to provide a reliably controllable filtering assembly leading to an efficient process of filtering.

SUMMARY OF THE INVENTION

The invention provides effective solution to the problems facing the art by disclosing the filter assembly having a control evacuating circuit for draining non-soluble solids accumulated as a result of a defective sleeve from the filter assembly. The circuit includes a plurality of valves incorporated in a various feeding circuits and controlled by a computer means or a Programmable Logic Controller (PLC) with the specifically designed software. The pulp detector is operatively connected with the control means so that upon reaching a predetermined level of the pulp accumulation the control means activate respective controllable valves.

More particularly the filter assembly essentially includes an elongated collapsible and displaceable filter body rockingly mounted on a support and formed with an inlet and two outlets, a means delivering a liquid product containing solids and including a controllable product feed valve, a means for delivering a washing liquid through a respective feed valve into the filter body and including a plurality of nipples, a sleeve resiliently mounted in the filter body and surrounded by the nipples and receiving the product for separating suspended solids therein by means of a two stage helical turbine received in the sleeve, a tank receiving the filtered liquid product from the second outlet and having a means for blocking a previously unfiltered pulp drained along with the liquid and an outlet means for draining the filtrate out of the assembly.

Particularly the present invention discloses a sensor means in the tank for generating a signal corresponding to a predetermined level of accumulated pulp and unfiltered solids on the blocking means, and filtered product outlet means for draining the filtrate out of the tank and provided with a controllable outlet drain valve and a controllable outlet blocking valve downstream from the outlet drain valve; and control means receiving the signal from the sensor means and operatively connected with the product feed valve, outlet drain valve and outlet blocking valve for generating a response signal closing the product feed and outlet blocking valves and opening the outlet drain valve respectively.

BRIEF DESCRIPTION OF THE DRAWING

Further objects, features and advantages of the invention will become more readily apparent from the following description accompanied by the drawing in which.

SPECIFIC DESCRIPTION

Figure 1:
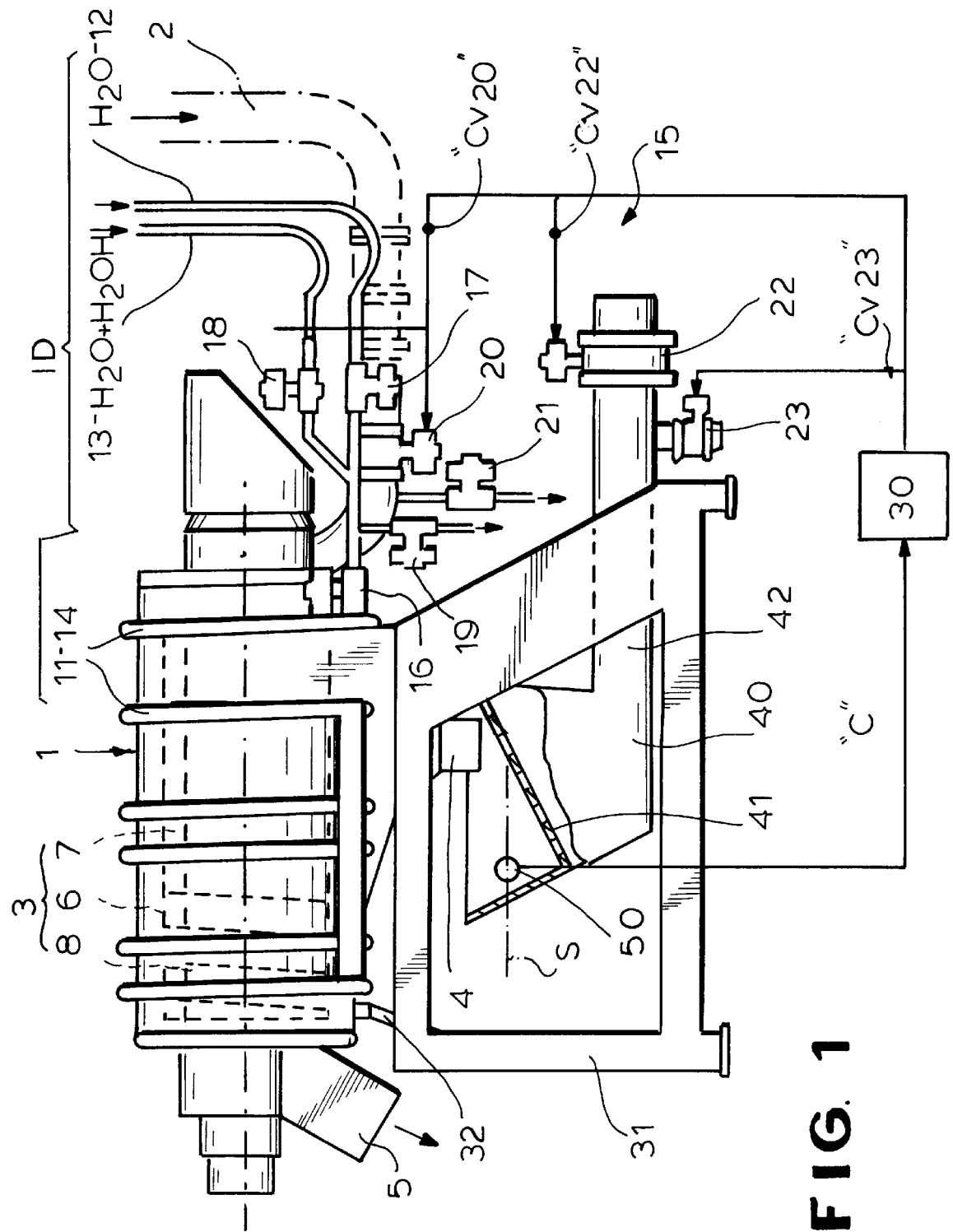
FIG. 1 is an elevated schematic side view of the assembly according to the invention.

The principal structure of the filter assembly essentially is illustrated in FIG. 1 and includes a collapsible filter body 1 mounted pivotally on a support 31 to perform a rocking movement. The filter body 1 can be thus rocked on the support due to a device 32 seen in FIG. 1 to change a position of a filter's body outlet for solids 5 with respect to a product inlet 2. The filter assembly is primarily designed to separate insoluble solids suspended in a liquid to be filtrated. As an example of such liquid, a citric juice containing a pulp is delivered to the product inlet pipe 2 for further filtering processing. The solids separated during the process are evacuated through the outlet 5 provided on an end of the filter body which is opposite the other end into which the product inlet pipe 2 opens. The latter is also formed with a product drain valve 21 formed with a respective driver for shutting the valve down.

The filter body houses a filtering element 3 including a sleeve 6 mounted on an inner wall by means of resilient elements 7. The sleeve receives a part of helical turbine 8 which, in turn, is formed with a first stage providing an entrance of the liquid to be filtered into the sleeve and with the second stage providing an actual separation of the solids from the liquid as a result of a cleaning effect. One end of the sleeve is in flow communication with the product inlet pipe 2 whereas the other end communicates with the outlet 5 of the filter body.

Figure 2:
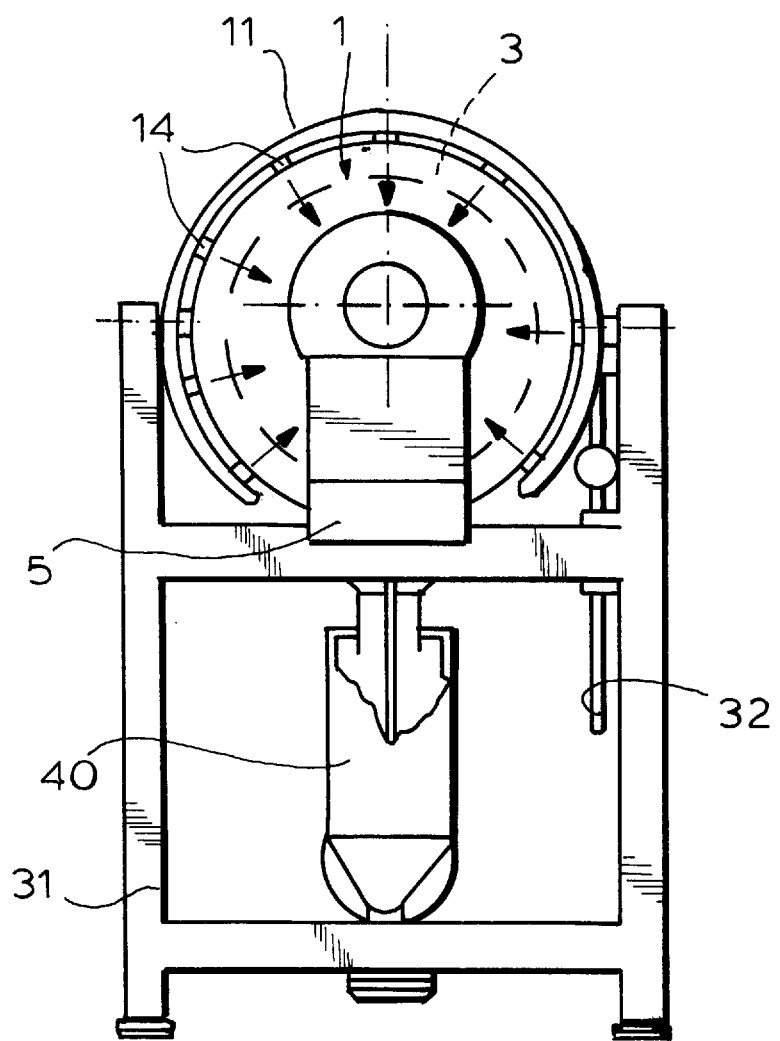
FIG. 2 is a schematic front view of the assembly shown in FIG. 1.

To improve the filtering process the assembly is further provided with a counterwashing circuit 10 delivering washing liquids into a space formed between the filtering body 1 and the sleeve 6. Two pipe 12 and 13 deliver water ($H_2O$) and soda ($H_2O+NaO—H$) from outside through feed valves 17 and 18 respectively which also have respective drives for closing the valves. The pipes 12 and 13 merge and, via a joint valve 16 having a respective drive, open into an arc shaped piping 11. The piping 11 belts the filtering body 1 and being a part of the counterwashing circuit 10. The counterwashing circuit is also provided with an evacuating valve 19 equipped with a respective drive and spaced upstream from the joint feed valve 16 and with a plurality of nipples 14 (FIG. 2) penetrating into the space between the filter body and the sleeve 6.

The bottom of the filter body is formed with a filtered product outlet 4 which is in flow communication with the sleeve, so that the liquid separated from insoluble solids contained in the pulp is evacuated from the filter body. The outlet 4 opens into a tank 40 mounted under the filter body and receiving the filtered product. The tank is provided with a grid shaped pulp detector 41 mounted below the separated product outlet and performing an ultimate separation of nonsoluble solids from the liquid. Finally the tanks is also formed with a controllable tank outlet valve 22 guiding the filtrate out of the assembly and with a controllable drain valve 23 both installed in an exit pipe 42.

The invention provides a control means 30 for controlling functioning of the valves in case of the damaged filtering sleeve.

Once the filtering sleeve 6 is ruptured the filtered solids initially designed to be drained through the body outlet 5 accumulate on the pulp detector 41 threatening to interrupt the filtering ability of the latter. Beginning with a certain level "S" the accumulation keeps increasing thus reaching critical predetermined level detected by a sensor means 50 mounted in the tank above the pulp detector and generating a signal "C" which sets off the control means 30. The latter, in turn, generates a series of the signals performing the following:

"Cv20" closes a product input valve 20 mounted upstream from the product drain valve 21 in the product inlet pipe 2;

"Cv22" closes the tank outlet valve 22; and

"Cv23" opens the drain valve 23.

Further, in case of emergency, the drives of the feed valves 17 and 18 of respective feed pipes of the washing liquids as well as the joint feed valve 16 controlling the flow of the cleaning liquids into the counterwashing circuit, the drives of the drain valves 21 and 19 of the product inlet and counterwashing circuit are also at work to respectively close and open the pertinent valves.

Additionally, the sensor and control means can further be provided with optical or sound signalling devices responding to the sensor means 50.

As a result of the above described inventive concept the product supply stops automatically and the accumulated material within the filter assembly is effectively removed without inefficient disassembling of the apparatus.

What is claimed is:

1. A filter assembly comprising:

a support;

a collapsible elongated filter body mounted on said support and formed with an inlet and first and second outlets, said support being provided with means for rocking said filter body;

first feed means for delivering a liquid product containing solids to be filtered toward said filter body along a product path and including a product drain valve located upstream from the inlet of the filter body and a controllable product feed valve spaced upstream from said product drain valve;

second feed means for delivering a washing liquid along a liquid path into said filter body and including a plurality of angularly spaced apart injector nipples, a liquid feed valve, a liquid drain valve downstream from the liquid feed valve and a liquid joint valve downstream from the liquid drain valve;

filtering means for separating insoluble solids from the product to be filtered and evacuated through said first outlet of the filter body and including:

a sleeve provided with means for resiliently mounting said sleeve in said filter body and forming a space therebetween, the injector nipples penetrating said body into the space and being positioned around the sleeve, said sleeve receiving the liquid product from the product feed means and being in communication with the first and second outlets of the filter body, a two stage helical turbine at least partly received in said sleeve for separating the solids evacuated through said first outlet from the liquid product drained through the second outlet of the filter body upon processing of the product in said turbine, a tank receiving the liquid product from the second outlet after processing in said turbine, a grid shaped pulp detector mounted in said tank and blocking previously unfiltered solids drained along with the liquid product through said second outlet of the filter body, sensor means in said tank for generating a signal corresponding to a predetermined level of accumulated unfiltered solids on said pulp detector, and filtered product outlet means for draining the filtrate out of said tank and provided with a controllable outlet drain valve and a controllable tank outlet blocking valve downstream from the outlet drain valve; and control means receiving said signal from the sensor means and operatively connected with said product feed valve, outlet drain valve and tank outlet valve for generating a response signal closing said product feed and tank outlet valves and opening said outlet drain valve respectively.

2. The filter assembly defined in claim 1 wherein said second means for feeding washing liquid includes a pair of pipes merging upstream from the liquid joint valve, said liquid feed and liquid joint valves, said liquid drain valve and drain product valve being provided with respective drives.

3. The filter assembly defined in claim 1 wherein said control means further comprises optical and sound means for generating respective visual and audio signals in response to the signal of the sensor means.

* * * * *